United States Patent [19]

Regener et al.

[11] Patent Number: 4,953,936
[45] Date of Patent: Sep. 4, 1990

[54] OPTICAL WAVEGUIDE MODULE WITH FIBER COUPLING

[75] Inventors: Rolf Regener, Schorndorf; Joachim Scholz, Marbach, both of Fed. Rep. of Germany

[73] Assignee: Standard Elektrik Lorenz Aktiengesellschaft, Stuttgart, Fed. Rep. of Germany

[21] Appl. No.: 401,937

[22] Filed: Sep. 1, 1989

[30] Foreign Application Priority Data

Sep. 20, 1988 [DE] Fed. Rep. of Germany ....... 3831905

[51] Int. Cl.⁵ .................................................. G03B 6/30
[52] U.S. Cl. ............................... 350/96.17; 350/96.11; 350/96.15
[58] Field of Search ................ 350/96.11, 96.15, 96.17, 350/96.2, 96.21, 96.22

[56] References Cited

U.S. PATENT DOCUMENTS

| | | | |
|---|---|---|---|
| 3,864,019 | 2/1975 | Smolinsky | 350/96.17 |
| 4,186,409 | 1/1980 | McMullin | 350/96.11 |
| 4,759,595 | 7/1988 | Boord et al. | 350/96.17 |
| 4,772,086 | 9/1988 | Bellerby et al. | 350/96.17 |
| 4,796,975 | 1/1989 | Lukas et al. | 350/96.11 |
| 4,836,645 | 6/1989 | Lefevre et al. | 350/96.17 |
| 4,865,413 | 9/1989 | Hubner et al. | 350/96.21 |

FOREIGN PATENT DOCUMENTS

| | | |
|---|---|---|
| 0276599 | 8/1988 | European Pat. Off. . |
| 0310535 | 4/1989 | European Pat. Off. . |
| 0318267 | 5/1989 | European Pat. Off. ........... 35/96.17 |
| 3408783 | 2/1985 | Fed. Rep. of Germany . |
| 3345715 | 6/1985 | Fed. Rep. of Germany . |
| 3608018 | 9/1987 | Fed. Rep. of Germany . |
| 2612301 | 9/1988 | France . |
| 63-041807 | 2/1988 | Japan .................................. 350/96.17 |
| 63-183404 | 7/1988 | Japan .................................. 350/96.17 |

OTHER PUBLICATIONS

"Fiber Attachment for Guided Wave Devices", Journal of Lightwave Technology, vol. 6, No. 6, Jun. 1988, pp. 862–871.

Primary Examiner—William L. Sikes
Assistant Examiner—John Ngo
Attorney, Agent, or Firm—Spencer & Frank

[57] ABSTRACT

To improve the stability and optical transmission properties of an optical waveguide module (1), a fillet-shaped supporting body (12, 13, 13') is used to hold the end (15) of a fiber, particularly of a polarization-maintaining fiber. The top side of the supporting body contains a groove (14) which extends in the direction of the body's longitudinal axis and in which the fiber end (15) is completely sunk and embedded in adhesive. After proper alignment, polished end faces of the fiber and the supporting body (12, 13, 13') are attached to the substrate (2) with adhesive.

4 Claims, 1 Drawing Sheet

OPTICAL WAVEGUIDE MODULE WITH FIBER COUPLING

BACKGROUND OF THE INVENTION

The present invention relates to an optical waveguide module with a fiber coupling composed of a supporting substrate having at least one integrated optical waveguide whose ends each are optically coupled, on each of two sides of the supporting substrate, to one end of a respective optical fiber with each fiber being fixed in the groove of a respective holder which is attached to the substrate.

Such modules are generally used as sensors and for optical communication. They consist of planar structures in which a substrate with an integrated optical circuit is implemented, for example, as a phase modulator, beam splitter, Mach-Zehnder interferometer, etc.

In an article entitled "Fiber Attachment for Guided Wave Devices", JOURNAL OF LIGHTWAVE TECHNOLOGY, Vol. 6, No. 6, June 1988, pages 862 to 871, waveguide modules with different fiber attachments and the difficulties encountered in their manufacture are described. For individual fiber attachment, the thickness of the substrate is increased by bonding a fillet to the substrate and butt-joining the fiber end to the outside of the substrate and fillet with adhesive. For increased stability, the fiber end may previously be fixed in a tubule or a suitable jewel with adhesive. However, this method is not suitable for attaching polarization-maintaining fibers because the substrate is made of lithium niobate, the tubule of metal, and the fiber end of quartz glass, and these materials have different coefficients of expansion, so that in case of temperature variations, the polarization of the light waves in the optical fiber would be adversely affected or destroyed.

In the example described in the article for the attachment of an array of polarization-maintaining optical fibers, the fiber ends are fixed between a grooved silicon chip and a glass plate covering the grooves, and the arrangement is bonded to the outside of the substrate, which is again strenghtened in the area of connection by means of a fillet. Such an array attachment is relatively expensive. The groove in the silicon chip are formed by anisotropic etching, which is relatively time-consuming. In addition, silicon, because of its crystalline structure, is rather brittle, so that special care must be taken in handling it during manufacture, and must be strenghtened by the glass plate to increase stability. Array attachment requires very good core-cladding concentricity. Polarization-maintaining fibers for wavelengths <1 μm, in particular, do not meet these requirements.

SUMMARY OF THE INVENTION

It is the object of the invention to simplify the coupling of polarization-maintaining quartz-glass fibers to an optical waveguide module of the type initially set forth above, and to improve the optical transmission properties of the fiber coupling by increasing its stability with respect to, e.g., temperature, vibration, and mechanical shock.

The above object is generally achieved according to the present invention in that in an integrated optical waveguide module with fiber coupling of the type initially set forth above, each holder is a fillet-shaped supporting body having a respective groove on one of its sides extending in the direction of the longitudinal axis of the supporting body, and in which the respective fiber end is completely sunk and embedded in an adhesive, the portions of the fiber ends disposed in the respective grooves are freed of any outer jacket and primary coating, and the supporting bodies and the fiber ends are all composed of quartz glass. Further advantageous features of the fiber coupling and advantages that can be gained by the invention are mentioned in the description.

BRIEF DESCRIPTION OF THE DRAWINGS

The invention will now be explained in more detail with reference to the embodiment illustrated in the accompanying drawing, in which.

DETAILED DESCRIPTION OF THE PREFERRED EMBODIMENTS

Figure 1:
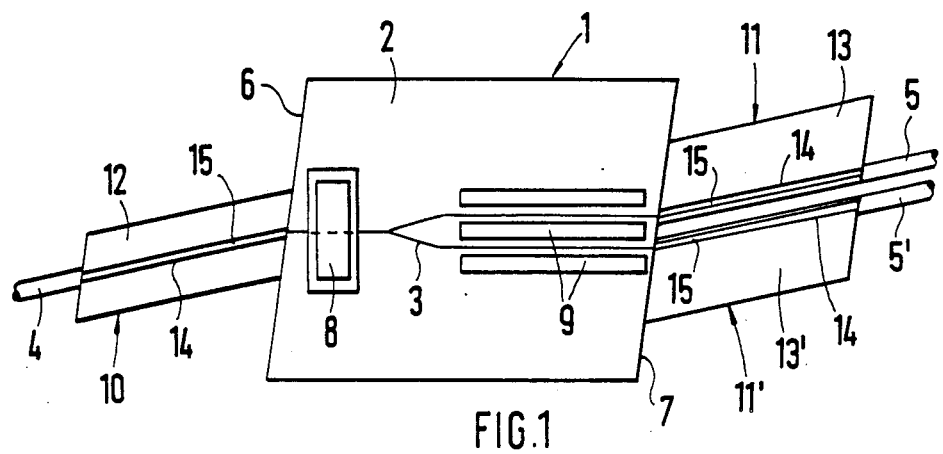
FIG. 1 is a top view of an optical waveguide module with fiber coupling according to the invention.
Figure 2:
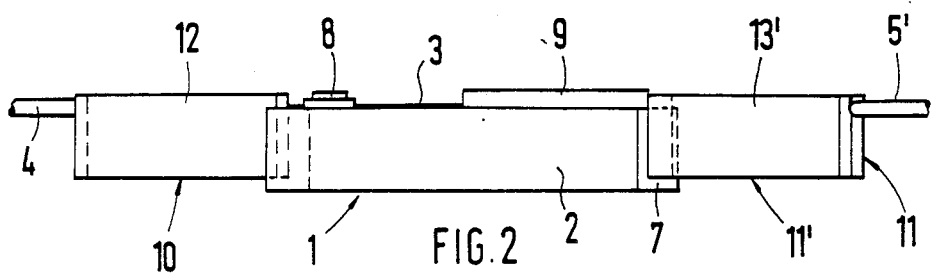
FIG. 2 is a side view of the optical waveguide module of FIG. 1.

In FIGS. 1 to 4, the waveguide module—henceforth called "module" for short, is generally designated 1. It consists essentially of a substrate 2 with at least one integrated optical waveguide 3 having an optical fiber 4, 5, 5' coupled to each of its ends. Depending on its intended use and site of operation, the module 1 is housed in a case which provides mechanical protection and may be hermetically sealed to resist environmental hazards (not shown).

In the present embodiment of the module 1, the waveguide 3 is designed as a beam splitter with Y-junction which begins as a single path on the input side 6 of the module 1 and ends as two paths on the output side 7 after passing through an integrated polarizer 8 and an integrated phase modulator 9.

The fiber-coupling device 10 on the input side 6 of the module 1 and the fiber-coupling devices 11, 11' on the output side 7 are each formed by a fillet-shaped supporting body 12, 13, 13' having a longitudinal groove 14 on its top side. In each groove 14, an end 15 of the respective fiber 4, 5, 5', from which the outer jacket and the primary coating have been removed, is fixed with adhesive. The fiber ends 15 are, for example, polarization-maintaining single-mode quartz-glass fibers having a cladding diameter of, e.g., 85 μm. Therefore, the width of the groove 14 in the supporting body 12, 13, 13' is, for example, 100 μm, and the depth for completely sinking the filter end 15 therein and holding a sufficient quantity of adhesive is 150 μm to 200 μm.

The supporting bodies are advantageously made from commercially available quartz-glass substrates of optical quality, which, unlike silicon, are easy to polish. From such substrates, which measure 50×50×1 mm, 1-mm-wide, 1-mm-thick, and 4-mm-long strips, for example, are cut and provided with grooves. In the embodiment being described, the supporting bodies 12, 13, 13' are square in section. They may also be rectangular in section, in which case the grooves 14 are arranged at one of the narrow long sides. To avoid any back reflection of light waves, the end faces of the glass bodies may be inclined to the fiber axis at an angle which is determined by the angles of the end faces of the input and output sides 6, 7 with respect to the longitudinal axis of the waveguide on the substrate 2.

Figures 3, 4:
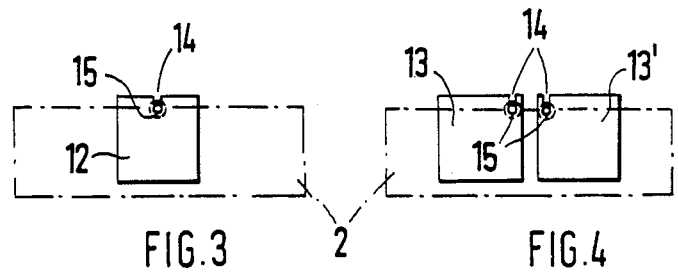
FIG. 3 is a schematic view of the input side of the waveguide module of FIG. 1.
FIG. 4 is a schematic view of the output side of the waveguide module of FIG. 1.

As shown in FIG. 3, the fiber end 15 to be connected with the optical waveguide 3 of the substrate 2 on the input side 6 is embedded in a groove 14 located centrically in the supporting body 12. The precise position of the groove 14 is unimportant, however, since there are sufficient degrees of freedom for aligning the fiber end 15 to the optical waveguide 3.

FIG. 4 shows two fiber-coupling devices 11, 11' which are designed to be attached to the output side 7 of the substrate 2. The supporting bodies 13, 13' have grooves 14 which extend parallel to and at a short distance from outside edges of those long sides of the supporting bodies which face each other in the mounting position. The distance between the grooves 14 is dependent on the distance between the optical waveguides 3 on the substrate 2, which is 450 $\mu$m, for example. Therefore, a distance of about 50 $\mu$m between the respective groove and the respective outside edge of the supporting body 13, 13' is sufficient to ensure individual alignment of the fiber end 15 to the respective optical-waveguide output and permit subsequent fixing of the respective supporting body 13, 13', although even shorter distances, e.g., 20 $\mu$m, are also possible.

To achieve the polarization-maintaining property of the fiber-coupling device 10, 11, 11', a starting material is chosen for the supporting body 12, 13, 13' which has a coefficient of expansion matched to that of the end 15 of the fiber 4, 5, 5', i.e., which is, as far as possible, the same material as that of the fiber end. In addition, the end faces of supporting bodies and of embedded fiber ends are polished together, whereby relatively large, flat surfaces are obtained which are bonded to the polished sides of the substrate 2 in a stable and stress-free manner. The supporting bodies described can also, of course, be used to hold and attach other optical fibers, such as multimode fibers, or other single-mode fibers of quartz glass, or plastic fibers.

We claim:

1. In an integrated optical waveguide module with fiber coupling including a substrate which supports at least one integrated optical waveguide whose ends are each optically coupled, at two sides of the substrate, to one end of a respective optical fiber fixed in the groove of a respective holder attached, after adjustment, to the substrate; the improvement wherein: each holder is a fillet-shaped supporting body having a respective said groove on its top side which extends in the direction of the longitudinal axis of the supporting body; the fiber end of each respective optical fiber is free of a primary coating and an outer jacket and is completely sunk and embedded in adhesive in a respective said groove; and each of said fiber end and each said supporting body is formed of quartz glass.

2. An integrated optical waveguide module with fiber coupling as claimed in claim 1, wherein each fillet-shaped supporting body has a coefficient of expansion matched to that of the end of the respective optical fiber.

3. An integrated optical waveguide module with fiber coupling as claimed in claim 1, wherein each said groove in the supporting body is located centrically.

4. An integrated optical waveguide module with fiber coupling as claimed in claim 1, wherein: two optical waveguides are disposed on the substrate and end close to one another at one side of the substrate; and, the grooves in the respective two supporting bodies adjacent said one side extend parallel and close to outside edges of those long sides of the said two supporting bodies which face each other.

* * * * *